United States Patent [19]

Hung

[11] Patent Number: 4,850,568

[45] Date of Patent: Jul. 25, 1989

[54] LEVER CONNECTING MECHANISM FOR HYDRAULIC JACKS

[76] Inventor: Michael Hung, 11th Flr., 624, Ming Chuan E. Road, Taipei, Taiwan

[21] Appl. No.: 270,354

[22] Filed: Nov. 14, 1988

[51] Int. Cl.[4] ........................ B60P 1/48; G05G 11/00

[52] U.S. Cl. ............................ 254/8 B; 254/DIG. 3; 74/481; 74/519; 74/512; 74/523

[58] Field of Search .............. 254/8 B, DIG. 3, 93 H; 74/512, 481, 141.5, 519, 560, 523, 524; 60/477, 479

[56] References Cited

U.S. PATENT DOCUMENTS

| | | | |
|---|---|---|---|
| 3,786,692 | 1/1974 | Björk | 74/512 |
| 3,885,449 | 5/1975 | Green | 74/512 |
| 4,210,314 | 7/1980 | Carroll | 254/8 B |
| 4,251,056 | 2/1981 | Maniglia | 245/8 B |
| 4,656,879 | 4/1987 | Jen | 254/93 H |
| 4,765,593 | 8/1988 | Hung | 245/8 B |

*Primary Examiner*—Rodney M. Lindsey
*Assistant Examiner*—Flemming Saether
*Attorney, Agent, or Firm*—Ladas & Parry

[57] ABSTRACT

A lever connecting mechanism for a horizontal hydraulic jack with tension rod comprises a vertical pumping rod having a traversed U-shape connecting member fixed thereon for receiving a bar provided on a foot pedal which is pivotally connected to the structure of the hydraulic jack, and a lever member pivotally connected to the structure of the hydraulic jack. The lever member has the same axis of rotation as the one of the foot pedal so that said lever member can be used to drive said foot pedal toward a downward direction. Since the foot pedal and the lever member are individually supported by two springs at their upmost position, the foot pedal can be depressed without affecting the lever member, but however, the downward movement of lever member will cause the foot pedal being depressed also.

3 Claims, 2 Drawing Sheets

LEVER CONNECTING MECHANISM FOR HYDRAULIC JACKS

FIELD OF THE INVENTION

This invention relates to an improved lever connecting mechanism for horizontal hydraulic jacks, and more particularly it relates to a lever mechanism which can be operated by hand or foot to provide the pumping action for pressurizing the hydraulic system of the jack.

BACKGROUND OF THE INVENTION

The portably hydraulic jacks, which can usually be seen in the market, can be divided mainly into two different groups with respect to the positions of their hydraulic cylinders. The first kind, which will be referred to herein as a vertical jack in the following, has its hydraulic cylinder placed in a vertical position the lifting action is done directly by the protrusion of the piston rod. The second kind, which will be referred as a horizontal jack in the following, has its hydraulic cylinder placed in a horizontal position the lifting arm is raised by the cylinder through linkages. This invention relates mainly to the horizontal jacks.

For a horizontal jack, the linkages of the lifting arm can be pushed directly by the hydraulic cylinder, or else the linkages of the lifting arm can be pulled by a tension rod pivotally connected to the top of the piston rod of the hydraulic cylinder. With the addition of the tension rod, the overall length of the horizontal jack can be shortened and this will cut down the overall weight of the whole construction.

The conventional portable horizontal jack, especially the horizontal jack with tension rod, can only be operated by hand. However, it is desirable to have a compact horizontal jack which can be operated by hand or foot conveniently.

SUMMARY OF THE INVENTION

It is an object of the present invention to provide a mechanism which can be operated by hand or foot to pressurize the hydraulic system of a horizontal jack of the type having a tension rod. With such a mechanism, which will not significantly complicate the device or sacrifice the compactness of the same, a portable horizontal jack with tension rod will be more handy to use.

According to the present invention, a lever connecting mechanism for a horizontal hydraulic jack with tension rod comprises a vertical pumping rod having a traversed U-shape connecting member fixed thereon for receiving a bar rotatably fixed on a foot pedal which is pivotally connected to the structure of the hydraulic jack, and a lever member pivotally connected to the structure of the hydraulic jack. The lever member has the same axis of rotation as the one of the foot pedal so that said lever member can be used to drive said foot pedal toward a downward direction. Since the foot pedal and the lever member are individually supported by two springs at their upmost position, the foot pedal can be depressed without affecting the lever member; however, the downward movement of lever member will cause the foot pedal being depressed also.

BRIEF DESCRIPTION OF THE DRAWING

The invention will be more fully understood from the following detailed description thereof, taken in conjunction with the accompanying drawings, in which.

DESCRIPTION OF PREFERRED EMBODIMENTS

Figure 1:
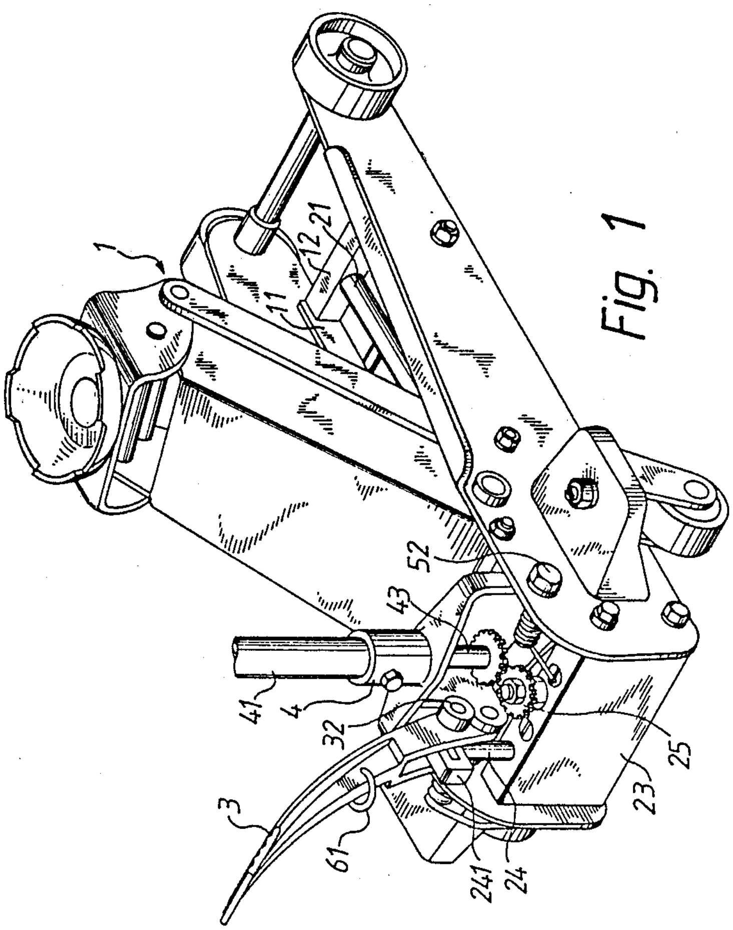
FIG. 1 is a perspective view of the embodiment of the lever connecting mechanism according to the present invention which is provided on a horizontal jack with tension rod.

As shown in the FIG. 1, for a horizontal hydraulic jack with tension rod, the lifting arm linkages 1 are lifted by the pulling force of a pair of tension rods 11 which are pivotally connected to a holding block 12 fixed to the top of a piston rod 21. The piston rod 21 is protruded by hydraulic pressure from a hydraulic cylinder (not shown) mounted on base means 23 which include pumping rod 24 and release valve control 25 with associated means. The reciprocating movement of the pumping rod 24 will pressurize the hydraulic cylinder 22 and the release valve control 25 can be operated in order to release the pressure inside the hydraulic cylinder 22.

Figure 2:
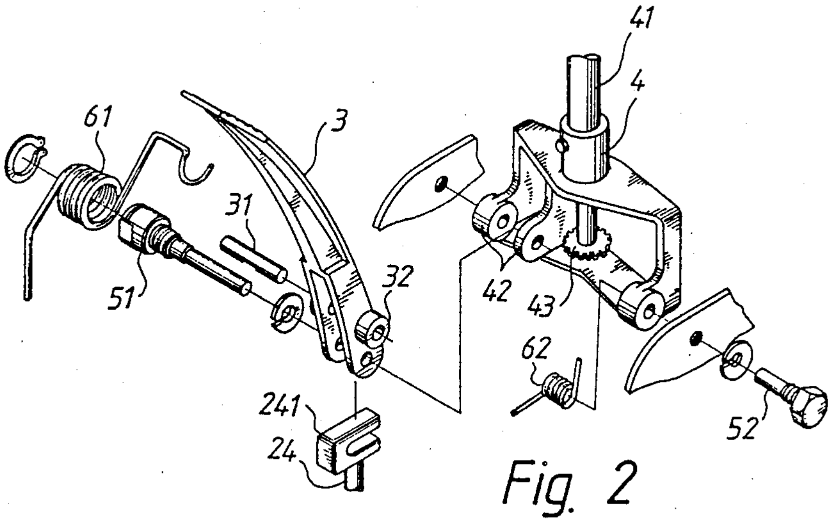
FIG. 2 is an isolated view of the embodiment of the lever connecting mechanism according to the present invention.
Figure 3:
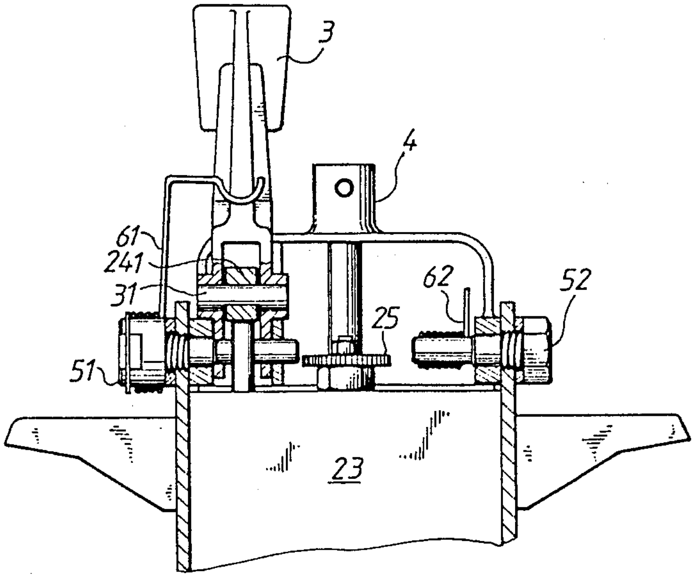
FIG. 3 is an isolated section view of the embodiment of the lever connecting mechanism according to the present invention.

As can be more clearly seen from FIGS. 2 and 3, the vertical pumping rod 24 has a traversed U-shape connecting member 241 provided on top of the vertical pumping rod 24, and the vertical pumping rod 24 can be forced to move downward and upward so that the hydraulic cylinder 22 can be pressurized. A foot pedal 3 and a lever member 4 are pivotally and coaxially connected to the frame structure of the hydraulic jack. The lever member 4 is connected by bolts 51 and 52, and the foot pedal 3 is connected by bolt 51 only. The foot pedal 3 provides a bar 31 which fits into the opening between the two legs of the traversed U-shape connecting member 241 for controlling and driving the movement of the pumping rod 24. The lever member 4 has a handle 41 which can be operated with hands, and two flanges 42 confronting two protrusions 32 provided on both sides of the foot pedal 3 for driving the foot pedal 3 toward a downward direction. The lever member 4 also contains control means 43 providing a gear corresponding to a gear provided on the release valve control 25 for the control of release valve.

The foot pedal 3 and the lever member 4 are individually supported by springs 61 and 62 in order to keep the foot pedal 3 and lever member 4 at their upmost position, so that, the foot pedal 3 can be depressed independently without affecting the position of the lever member 4 or the foot pedal 3 can be depressed by the downward movement of the lever member 4. The spring 61 is installed on the bolt 51 and the two ends of the spring 61 are placed against the foot pedal 3 and wheel bracket of the hydraulic jacks. As for the spring 62, it is installed on the bolt 52 and the two ends of it are placed against the lever member 4 and base means 23 of the hydraulic jack.

It is understood that the forgoing description and accompanying illustrations are merely exemplary, and various changes and modifications to the preferred embodiments will be apparent to those skilled in the art. The scope of this invention is defined solely by the appended claims and their equivalents.

I claim:

1. A lever connecting mechanism for a horizontal hydraulic jack with tension rod, comprising, a vertical pumping rod having a traversed U-shape connecting member fixed on top of said vertical pumping rod, whereby the reciprocating movement of said vertical pumping rod will pressurize a hydraulic cylinder of said hydraulic jack, a foot pedal pivotally connected to the frame structure of said hydraulic jack and providing a bar which can fit into the opening between the two legs of said traversed U-shape connecting member for controlling and driving the movement of said connecting member together with said vertical pumping rod, a lever member pivotally connected to the frame structure of said hydraulic jack having the same axis of rotation as said foot pedal, and said lever member having a handle and means for driving said foot pedal toward a downward direction so that said foot pedal can be depressed independently without affecting said lever member or depressed by the downward movement of said lever member and two spring means individually installed on said frame structure for supporting said foot pedal and said lever member at their upmost position.

2. The lever connecting mechanism of claim 1, wherein said handle of said lever member contains means for controlling a release valve means of said hydraulic cylinder in said hydraulic jack.

3. The lever connecting mechanism of claim 1, wherein said spring means for supporting said foot pedal is a torsional spring installed about the axis about which the said foot pedal rotates, and the two ends of said torsional spring are placed individually against said foot pedal and a wheel bracket of said jack.

* * * * *